United States Patent [19]

Hawsey et al.

[11] Patent Number: 5,184,189
[45] Date of Patent: Feb. 2, 1993

[54] NON-INTRUSIVE BEAM POWER MONITOR FOR HIGH POWER PULSED OR CONTINUOUS WAVE LASERS

[75] Inventors: Robert A. Hawsey; Matthew B. Scudiere, both of Oak Ridge, Tenn.

[73] Assignee: The United States of Americas as represented by the United States Department of Energy, Washington, D.C.

[21] Appl. No.: 706,831

[22] Filed: May 29, 1991

Related U.S. Application Data

[63] Continuation-in-part of Ser. No. 412,713, Sep. 26, 1989, abandoned.

[51] Int. Cl.$^5$ .............................. G01J 1/42; H01S 3/13
[52] U.S. Cl. ........................... 356/218; 250/205; 372/31
[58] Field of Search ................. 356/213, 218, 224-236, 356/121; 372/29-31; 250/205, 493.1, 505.1

[56] References Cited

U.S. PATENT DOCUMENTS

| | | | |
|---|---|---|---|
| 3,928,761 | 12/1975 | Dunigan | 250/205 |
| 3,946,335 | 3/1976 | De loach, Jr. et al. | 372/31 |
| 3,996,526 | 12/1976 | d'Auria et al. | 372/31 |
| 4,247,764 | 1/1981 | Kissinger | 250/205 |
| 4,611,352 | 9/1986 | Fujito et al. | 372/31 |
| 4,695,714 | 9/1987 | Kimizuka et al. | 250/205 |
| 4,819,240 | 4/1989 | Takiguchi et al. | 372/29 |
| 4,856,011 | 8/1989 | Shimada et al. | 372/31 |
| 4,879,459 | 11/1989 | Negishi | 250/205 |
| 4,884,280 | 11/1989 | Kinoshita | 372/29 |
| 4,937,461 | 6/1990 | Traina | 250/205 |
| 4,977,564 | 12/1990 | Ryu et al. | 372/31 |

Primary Examiner—Richard A. Rosenberger
Assistant Examiner—Hoa Q. Pham
Attorney, Agent, or Firm—David E. Breeden; Stephen D. Hamel; William R. Moser

[57] ABSTRACT

A system and method for monitoring the output of a laser is provided in which the output of a photodiode disposed in the cavity of the laser is used to provide a correlated indication of the laser power. The photodiode is disposed out of the laser beam to view the extraneous light generated in the laser cavity whose intensity has been found to be a direct correlation of the laser beam output power level. Further, the system provides means for monitoring the phase of the laser output beam relative to a modulated control signal through the photodiode monitor.

10 Claims, 3 Drawing Sheets

NON-INTRUSIVE BEAM POWER MONITOR FOR HIGH POWER PULSED OR CONTINUOUS WAVE LASERS

This invention is a continuation-in-part of application Ser. No. 07/412,713, filed Sep. 26, 1989, and now abandoned.

BACKGROUND OF THE INVENTION

This invention, which is a result of a contract with the United States Department of Energy (Contract No. DE-AC05-840R21400), relates generally to methods and systems for measuring beam parameters of a laser, and more specifically to methods and systems for continuously monitoring the output beam parameters of a pulsed or continuous wave laser without interrupting or intercepting any portion of the laser beam.

There are numerous applications in which it is desirable to continuously monitor and/or control beam parameters of a laser, especially high power pulsed or continuous wave (CW) lasers, without interrupting the laser beam or redirecting a portion of the beam. In all known prior art techniques for monitoring laser beam parameters, the beam is either blocked completely or redirected into a calorimeter or thermopile or a portion of the beam is reflected into a lower energy detecting and measuring device. The problem with either of these methods is that the beam must be at least partially interrupted or perturbed in order to make beam parameter measurements.

In systems which block the beams of high power lasers completely the devices are subject to permanent damage and, further, personnel are at risk through exposure to the laser beam itself during power output measuring operations. In addition, these devices obviously cannot respond to rapidly changing laser power levels which are necessary in applications where continuous monitoring of the beam is necessary.

Although attempts have been made to improve the beam monitoring techniques of especially high power lasers by monitoring a portion of the beam rather than blocking the beam entirely to make power measurements, these devices all require some form of reflection or redirection device which introduces beam perturbations that alter the beam power and thus the accuracy and reliability of the measurement. Therefore, there is a need for a system and method to continuously monitor the beam parameters of a laser which does not intercept any portion of the beam.

SUMMARY OF THE INVENTION

In view of the above need, it is an object of this invention to provide a system and method for continuously monitoring parameters of a laser beam which does not require any interruption or perturbation of the beam being measured.

Another object of this invention is to provide a laser beam monitoring system as in the above object which is applicable to both continuous and pulsed beam applications.

Yet another object of this invention is to provide a laser beam monitoring system as in the above objects in which both the real time beam power and phase angle relative to a time varying laser control signal may be monitored.

Other objects and many of the attendant advantages of the present invention will become apparent to those skilled in the art from the following detailed description taken in conjunction with the drawings.

Briefly, the invention is a system and method for continuously, indirectly monitoring the output of a laser wherein a photodiode is positioned out of the laser beam path to detect optical emissions of extraneous light from the lasing medium as a correlated measure of the laser output beam power.

A further aspect of this invention is to provide a system and method for continuously monitoring the output of a laser wherein the output of the photodiode detector is also used to measure the phase shift of the laser beam output corresponding to an external, time varying laser excitation signal. In this embodiment, a phase meter may be used to determine the phase difference between the desired setting, or reference signal, and the actual, or output phase. The reference signal and the signal from the photodetector are converted to digital signals and fed into the meter. The meter analyzes the signals to find the fundamental frequency and calculate the phase difference between the two signals. This value may be displayed on a digital display meter and/or used to control the phase difference automatically.

DETAILED DESCRIPTION

Figure 1:
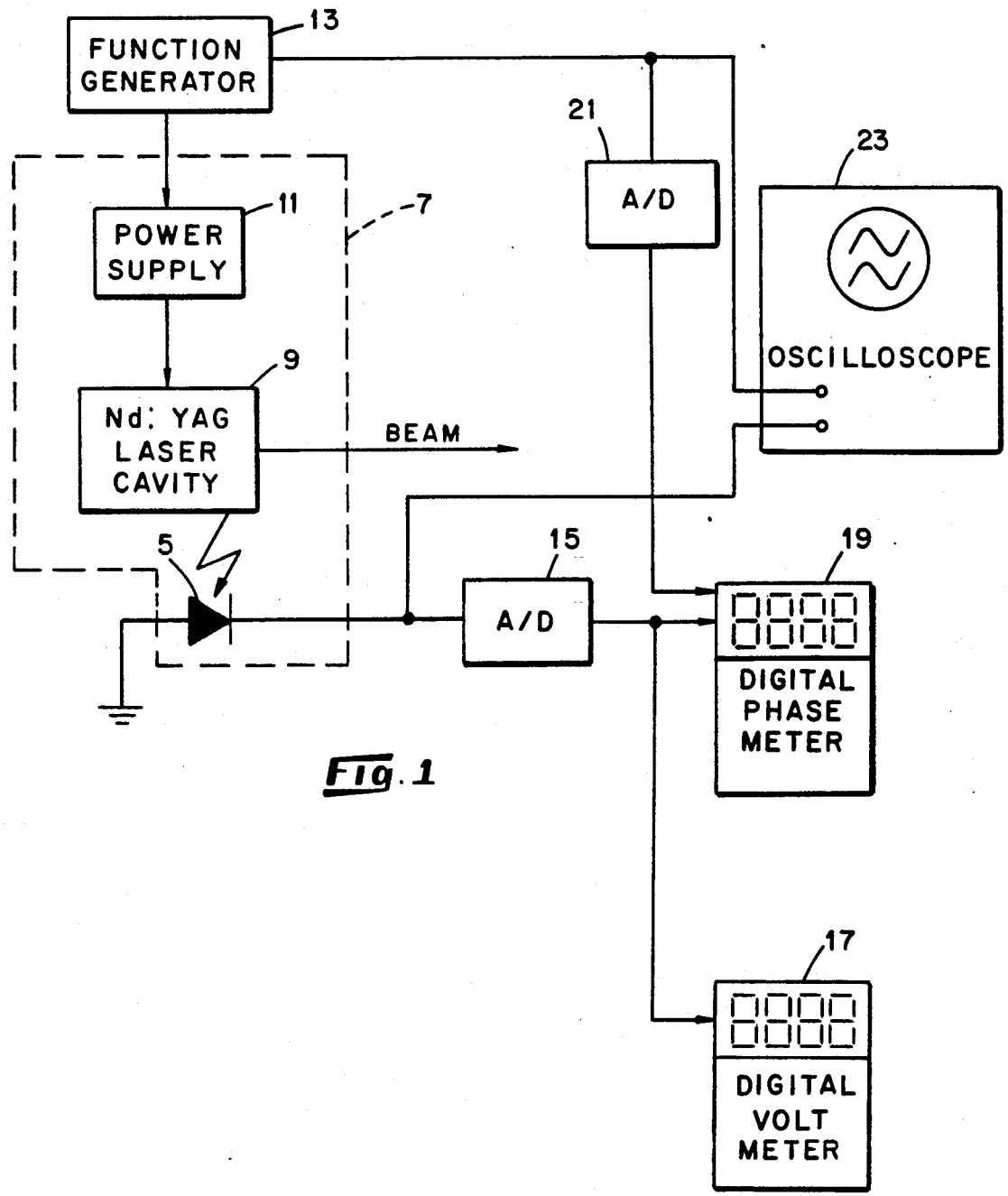
FIG. 1 is a schematic diagram of a system for monitoring the output of a high power continuous wave Nd:YAG laser.

Referring now to FIG. 1, wherein there is shown a laser monitoring system according to the present invention, an optical detector responsive to the laser cavity emission wavelengths of interest, such as a commercially available photodiode 5, is positioned within the housing 7 of a conventional Nd:YAG laser to view the extraneous light from the laser cavity 9. This extraneous light is the incoherent light emitted from about an excited lasing medium or cavity which is producing the laser beam to be monitored and is not a reflected or redirected portion of a laser beam generated by the lasing medium. Although the invention will be illustrated with a solid state laser, it will be obvious to those skilled in the art that the invention is applicable to the monitoring of other types of lasers which have different lasing mediums, such as gas or liquid lasing mediums.

The laser includes a power supply 11 which may be connected to receive a time varying control signal for modulating the output beam by correspondingly varying the applied power. In this embodiment a programmable function generator 13 is connected to the power supply 11 for selectively applying a control signal to the power supply 11.

As shown, the photodiode 5 is connected through an analog-to-digital converter 15 to the input of a digital voltmeter 17, which may be calibrated to display the laser beam power directly in proportion to the voltage across the diode 5. Further, the output of diode 5 may be applied to one input of a digital phase meter 19 while the function generator signal is also applied to another input through an analog-to-digital converter 21. The phase meter may be used to compare the difference in phases between the applied control signal and the laser output beam, which has been found to be identical to the phase relationship between the control signal and the photodiode 5 sensing the cavity light. In addition, this phase dependent signal may be used as a feedback signal to control the laser output signal in automated processing applications.

In order to evaluate the non-intrusive beam measuring system, measurements were made of a laser beam response to a control signal. The solid state laser 9 of FIG. 1 was coupled with the photodiode 5 and the function generator 13. The outputs of the photodiode and the function generator were connected to an oscilloscope 23 so that the phase difference between an applied signal from the function generator and the photodiode output could be observed and measured. In addition, the two signals were digitized through the A/D converters 15 and 21, and phase and amplitude were then accurately measured in digital form with the meters 17 and 19. Further, a small portion of the laser output beam was directed onto an additional photodiode whose output could be directed to one input of the oscilloscope through a switch to select either the laser cavity photodiode output or the beam sampling photodiode output for comparison. Several qualitative and quantitative measurements confirmed that the subject beam monitoring system may be used to measure the laser beam power and the phase shift between the supply voltage control signal and the laser output by measuring the extraneous optical emission directly from the laser cavity.

Figure 2:
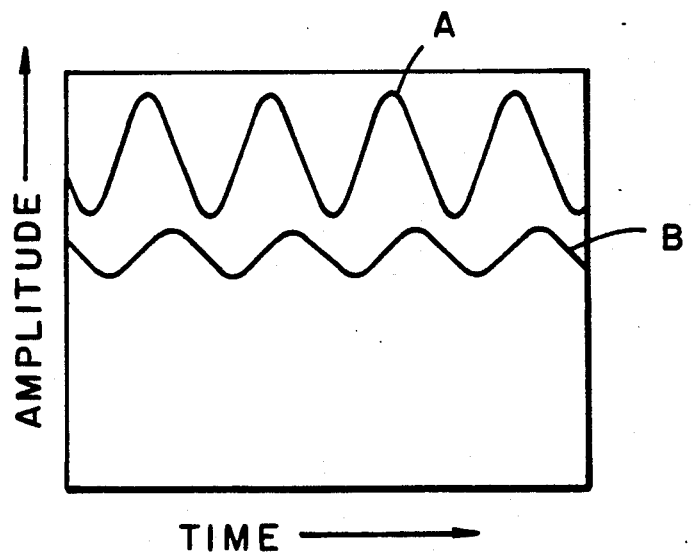
FIG. 2 is an oscillograph illustrating the laser cavity light response signal (B) to a sinusoidal power supply command signal (A).
Figure 3:
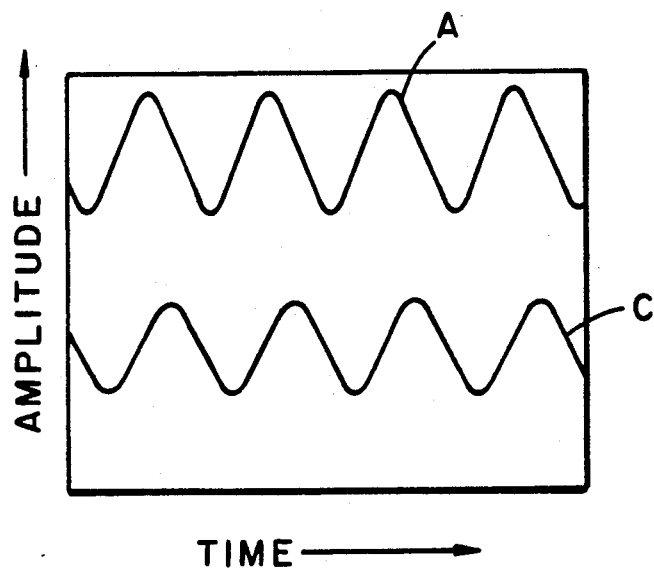
FIG. 3 is an oscillograph illustrating the actual laser beam response signal (C) to the sinusoidal power supply command signal (A).

As shown in the comparison of the oscilloscope traces of FIGS. 2 and 3, the phase shift between a sinusoidal input signal (A) to the laser power supply and the cavity light sensing diode output signal (B), FIG. 2, was identical to that measured by the diode viewing a portion of the laser beam (C), FIG. 3.

Figure 4:
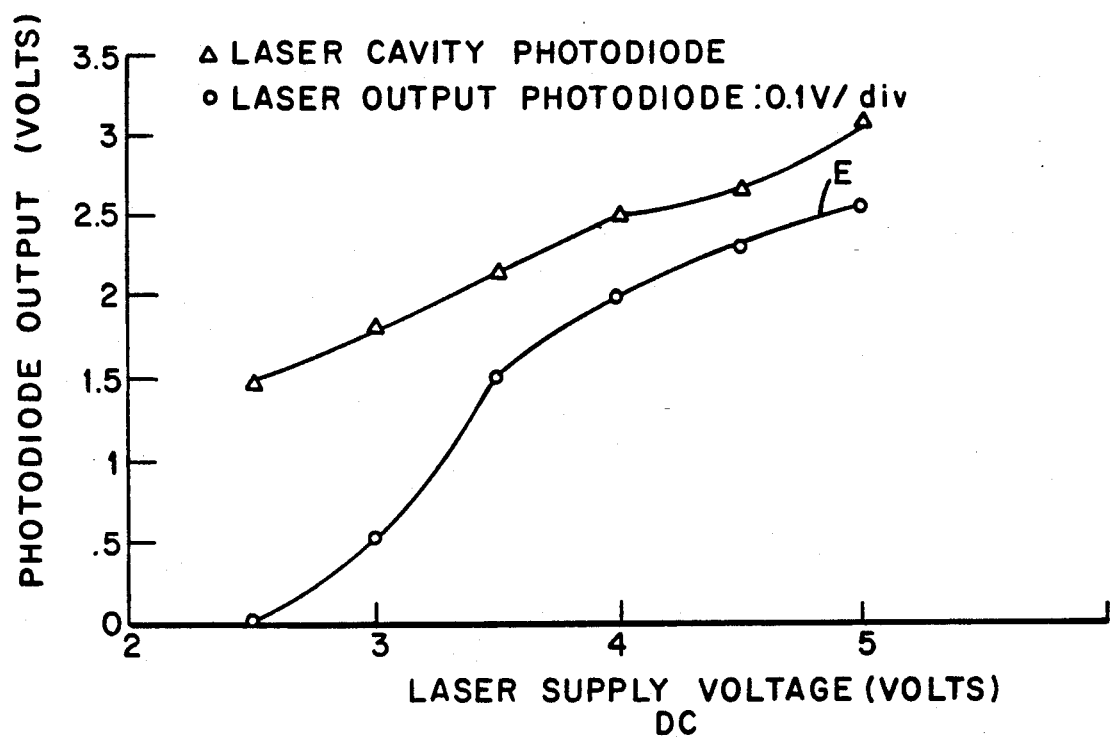
FIG. 4 is a graph (curve D) of the laser cavity light-sensing photodiode output voltage versus DC power supply voltage for a laser monitoring system as illustrated in FIG. 1 together with a graph (curve E) of the voltage output of a photodiode sensing a portion of the output beam, illustrating the essentially linear correspondence between the cavity light sensing photodiode and the laser beam output power.

In order to verify that the output of the cavity photodiode 5, which is measuring the intensity of the extraneous light from the cavity as defined above, may be correlated to the beam output power, a DC voltage was applied to the laser power supply and the output of the photodiode 5 was compared to that of the diode viewing a portion of the output beam. FIG. 4 shows the output voltage of the photodiode 5 (curve D) and the output beam photodiode (curve E) versus power supply voltage. It will be seen that for supply voltage levels above about 3.5 volts that the cavity light sensing photodiode output is essentially a linear indication of the output beam power. Therefore, it will be seen that the laser cavity emissions provide accurate phase response and power level information without intercepting a portion of the output beam to provide the measurement as in previously known laser beam monitoring systems. Knowing the response of the laser to the input supply voltage level, the meter used to monitor the photodiode 5 output may be calibrated for a particular laser to read the laser output power directly.

Thus, it will be seen that a system and method have been provided for continuously monitoring the output parameters of a laser which does not interrupt the laser beam and can be used to control the output of the laser beam relative to a modulated control signal. Although the invention has been illustrated by means of the description of a single example, it will be apparent to those skilled in the art that the system may be applied in various aspects, with various modifications and changes, without departing from the spirit and scope of the invention as set forth in the following claims which form a part of this specification.

We claim:

1. A system for monitoring parameters of an output beam of a laser, comprising:
   a. a laser beam generating device including a lasing medium from which an output laser beam is generated along a beam path upon excitation and from which incoherent light is simultaneously emitted about said lasing medium upon said excitation of said lasing medium;
   b. a light detecting means disposed out of the beam path of said laser beam generating device for viewing only said incoherent light emitted from about said lasing medium and generating an output signal proportional thereto; and
   c. indicating means responsive to the output of said light detecting means for indicating the output laser beam power level of said laser beam generating device in response to the amplitude of said output signal of said light detecting means.

2. The laser beam monitoring system as set forth in claim 1 wherein said light detecting means is a photodiode.

3. The laser beam monitoring system as set forth in claim 1 wherein said laser beam generating device includes a power supply means coupled with said lasing medium for supplying energy to produce said laser beam and further including means for applying a modulation signal to said power supply for varying the beam power of said laser in accordance with said modulation signal, and phase detector means responsive to the output of said light detecting means and said modulation signal for measuring the phase difference between said modulation signal and said output of said light detecting means as a direct measure of the phase response of said beam of said laser to said modulation signal applied to said power supply of said laser.

4. The laser beam monitoring system as set forth in claim 3 wherein said phase detecting means is a phase meter having a first input connected to receive said modulation signal and a second input connected to receive said output signal of said light detecting means.

5. The laser beam monitoring system as set forth in claim 4 wherein said laser is a continuous wave laser.

6. The laser beam monitoring system as set forth in claim 5 wherein said lasing medium is as solid state lasing medium.

7. The laser beam monitoring system as set forth in claim 4 wherein said laser is a pulsed laser.

8. A method for monitoring parameters of an output laser beam of a laser which does not require intercepting any portion of a laser beam generated thereby, said laser including a lasing medium from which incoherent light emanates from about said medium upon excitation of said medium during generation of a laser beam, comprising the steps of:

a. detecting only said incoherent light emanating from said lasing medium and generating an output signal proportional thereto; and b. measuring the amplitude of said output signal to indicate the output beam power of said laser beam in response to the intensity of said incoherent light emanating from said lasing medium.

9. The method as set forth in claim 8 wherein said detecting step includes measuring said incoherent light emitted from said lasing medium by means of a light detecting means disposed to view only said incoherent light emanating from said lasing medium.

10. The method as set forth in claim 9 wherein said light detecting means is a photodiode.

* * * * *